US009438843B2

(12) United States Patent
Nakade et al.

(10) Patent No.: US 9,438,843 B2
(45) Date of Patent: *Sep. 6, 2016

(54) OPERATION CONTROLLING APPARATUS

(71) Applicant: Hitachi Maxell, Ltd., Osaka (JP)

(72) Inventors: Mayumi Nakade, Yokohama (JP); Mayuko Tanaka, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 128 days.

This patent is subject to a terminal disclaimer.

(21) Appl. No.: 14/186,471

(22) Filed: Feb. 21, 2014

(65) Prior Publication Data
US 2014/0168524 A1 Jun. 19, 2014

Related U.S. Application Data

(63) Continuation of application No. 13/299,398, filed on Nov. 18, 2011, now Pat. No. 8,710,951.

(30) Foreign Application Priority Data

Dec. 6, 2010 (JP) .................................. 2010-271027

(51) Int. Cl.
*H04N 5/44* (2011.01)
*G08C 17/02* (2006.01)
*G08C 23/04* (2006.01)
*G06F 3/01* (2006.01)
(Continued)

(52) U.S. Cl.
CPC ............ *H04N 5/4403* (2013.01); *G06F 3/017* (2013.01); *G06F 3/0425* (2013.01);
(Continued)

(58) Field of Classification Search
CPC G08C 17/02; G06F 3/017; H04N 21/44218; H04N 21/4131

USPC .................. 340/4.3, 12.22; 715/200; 341/20
See application file for complete search history.

(56) References Cited

U.S. PATENT DOCUMENTS 8,183,977 B2 * 5/2012 Matsumoto ..................... 340/5.1
8,523,366 B2 * 9/2013 Takahashi ....................... 353/69
(Continued)

FOREIGN PATENT DOCUMENTS

JP 2001-005975 1/2001
JP 2004-356819 12/2004
(Continued)

OTHER PUBLICATIONS

JP Office Action for Japanese Application No. 2013-255582, issued on Aug. 26, 2014.

*Primary Examiner* — Jennifer Mehmood
*Assistant Examiner* — Omar Casillashernandez
(74) *Attorney, Agent, or Firm* — Baker Botts L.L.P.

(57) ABSTRACT

Operation controlling apparatus executing equipment operation controlling, including: an equipment management portion configured to manage control commands corresponding to plural number of control items; a video producing portion configured to produce videos corresponding to the plural number of control items; a video display portion configured to display video produced by the video producing portion laying on a control surface; a distance detector portion configured to detect distance from the video producing portion to the control surface; and a controller portion configured to control the video display portion, so that a size of the video to be displayed by the video display portion is within a size of the control surface, depending on the distance detected by the distance detector portion, and to make equipment of a control target execute the control command, which is managed by the equipment management portion, when execution of the control item is determined.

8 Claims, 15 Drawing Sheets

(51) Int. Cl.
  *G06F 3/042*     (2006.01)
  *H04N 21/41*     (2011.01)
  *H04N 21/422*    (2011.01)
  *H04N 21/436*    (2011.01)
  *H04N 21/442*    (2011.01)
  *H04N 21/4223*   (2011.01)

(52) U.S. Cl.
  CPC ........... *G06F 3/0426* (2013.01); *G08C 17/02* (2013.01); *G08C 23/04* (2013.01); *H04N 21/4131* (2013.01); *H04N 21/42204* (2013.01); *H04N 21/43615* (2013.01); *H04N 21/44218* (2013.01); *G08C 2201/32* (2013.01); *H04N 21/4223* (2013.01)

(56) References Cited

U.S. PATENT DOCUMENTS

| | | | |
|---|---|---|---|
| 2005/0259226 A1* | 11/2005 | Gilg .................... | H04N 9/3185 353/69 |
| 2007/0247599 A1* | 10/2007 | Kadowaki et al. .......... | 353/101 |
| 2009/0161027 A1* | 6/2009 | Hardacker et al. .......... | 348/734 |
| 2010/0079677 A1* | 4/2010 | Matsubara et al. .......... | 348/699 |
| 2011/0115823 A1* | 5/2011 | Huebner ...................... | 345/661 |

FOREIGN PATENT DOCUMENTS

| | | |
|---|---|---|
| JP | 2005-018385 | 1/2005 |
| JP | 2009-205498 | 9/2009 |

\* cited by examiner

| CONTROL ITEM | SCREEN IMAGE |
|---|---|
| CONTROL ITEM 1 "CHANNEL UP" | CH ▲ — 501 |
| CONTROL ITEM 2 "CHANNEL DOWN" | CH ▼ — 502 |
| CONTROL ITEM 3 "VOLUME UP" | VOLUME ▲ — 503 |
| CONTROL ITEM 4 "VOLUME DOWN" | VOLUME ▼ — 504 |
| CONTROL ITEM 5 "POWER OFF" | POWER OFF — 505 |
| OTHER THAN CONTROL ITEM SETUP REGION | OUTSIDE RECOGNITION REGION. PLEASE MOVE YOUR HAND UPWARDS. — 506 |

FIG. 8

| CONTROL TARGET | EQUIPMENT ID | CONNECTION INFORMATION | SELECTION SEQUENCE | CONTROL ITEM | CONTROL ID | CONTROL COMMAND | DISPLAY CONDITION | |
|---|---|---|---|---|---|---|---|---|
| 801 | 802 | 803 | 804 | 805 | 806 | 807 | 808 | |
| TV | 001 | xxxx | 1 | CH UP | 001 | aaaa | 001 | ... |
| | | | | CH DOWN | 002 | bbbb | 001 | ... |
| | | | | VOLUME UP | 003 | cccc | 001 | ... |
| | | | | VOLUME DOWN | 004 | dddd | 001 | ... |
| | | | | POWER OFF | 005 | eeee | 001 | ... |
| | | | | POWER ON | 006 | ffff | 002 | ... |
| AIR CONDITIONER | 002 | yyyy | 2 | TEMPERATURE UP | 001 | gggg | 001 | ... |
| | | | | TEMPERATURE DOWN | 002 | hhhh | 001 | ... |
| .. | .. | .. | .. | .. | .. | .. | .. | .. |

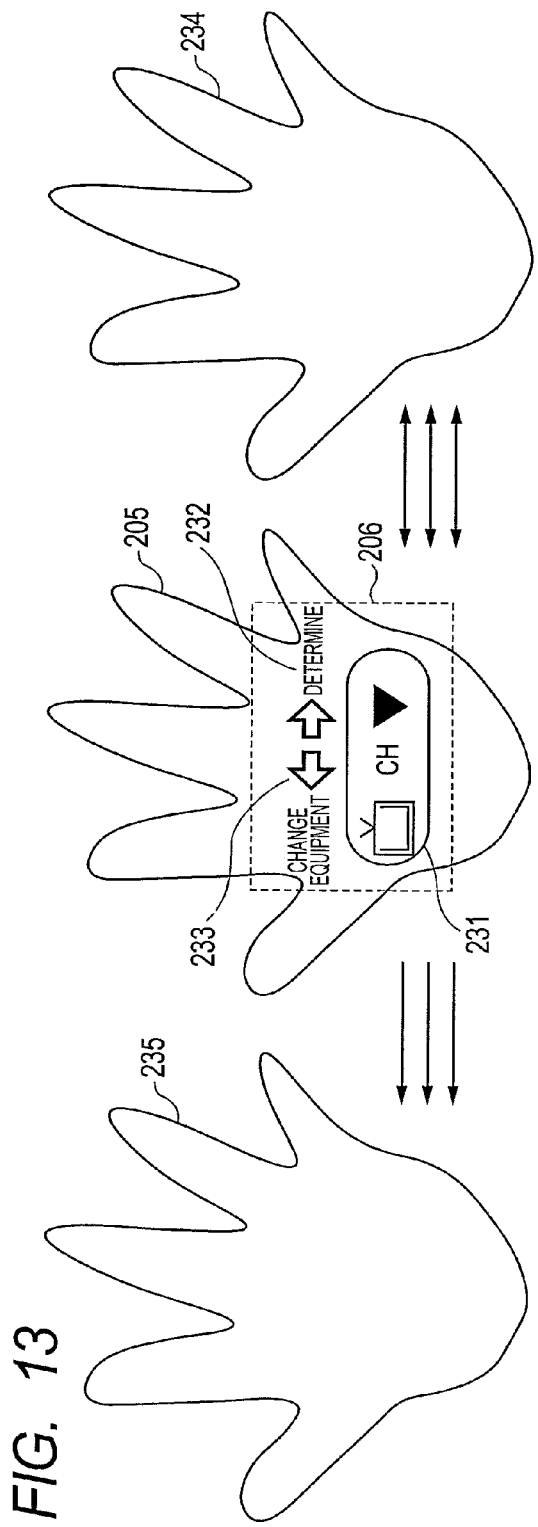
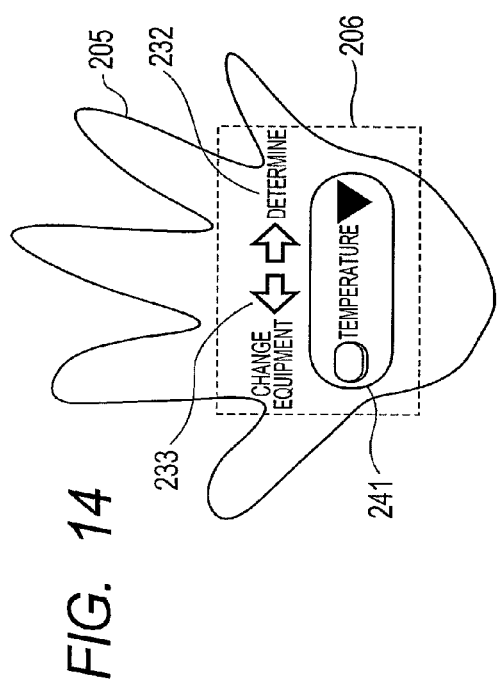

OPERATION CONTROLLING APPARATUS

CROSS REFERENCE TO RELATED APPLICATION

This is a continuation of U.S. application Ser. No. 13/299,398, filed Nov. 18, 2011. This application relates to and claims priority from Japanese Patent Application No. 2010-271027, filed on Dec. 6, 2010. The entirety of the contents and subject matter of all of the above is incorporated herein by reference.

BACKGROUND OF THE INVENTION

The present invention relates to an operation controlling apparatus for operating/controlling various kinds of equipments within a home.

For household equipments of recent years, such as, a television receiver (hereinafter, being abbreviated "TV") or an air conditioner, etc., it is common to be operated by a remote controller, which is provided for controlling from a remote place.

Herein, in the following Patent Document 1 is disclosed a remote operating apparatus, on which an operator can recognize if the operation is accepted or not, even on the way of operations, upon the trigger of a movement of a human-being, whose image is picked up by a photographing means, by taking the fact into the consideration thereof, that the equipments could be operated, remotely, even in cases where the remote controller is not kept in her/his vicinity or lost. (See [0007] and [0008] of the Patent Document 1)

PRIOR ART DOCUMENTS

Patent Documents

[Patent Document 1] Japanese Patent Laying-Open No. 2004-356819 (2004).

BRIEF SUMMARY OF THE INVENTION

However, with the invention disclosed in the Patent Document 1 mentioned above, the operator must make such a movement for remotely controlling that she/he can be photographed by the photographing means; i.e., being inferior in operability thereof. Then, an object according to the present invention is to increase or improve the operability, without applying the photographing means in the remote operations.

For accomplishing the object mentioned above, according to the present invention, there are applied such structures as will be described in the claims, for example.

According to the present invention, it is possible to conduct the remote operation having high operability, to plural numbers of household equipments.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 8 is a view for showing an example of equipment management information of the operation controlling apparatus, according to the embodiment 1;

FIG. 13 is a view for showing an example of operation of the operation controlling apparatus, according to the embodiment 2;

FIG. 14 is a view for showing an example of operation of the operation controlling apparatus, according to the embodiment 2;

DETAILED DESCRIPTION OF THE PREFERRED EMBODIMENTS

Hereinafter, explanation will be given on embodiments according to the present invention, by referring to the attached drawings.

<Embodiment 1>

Figure 1:
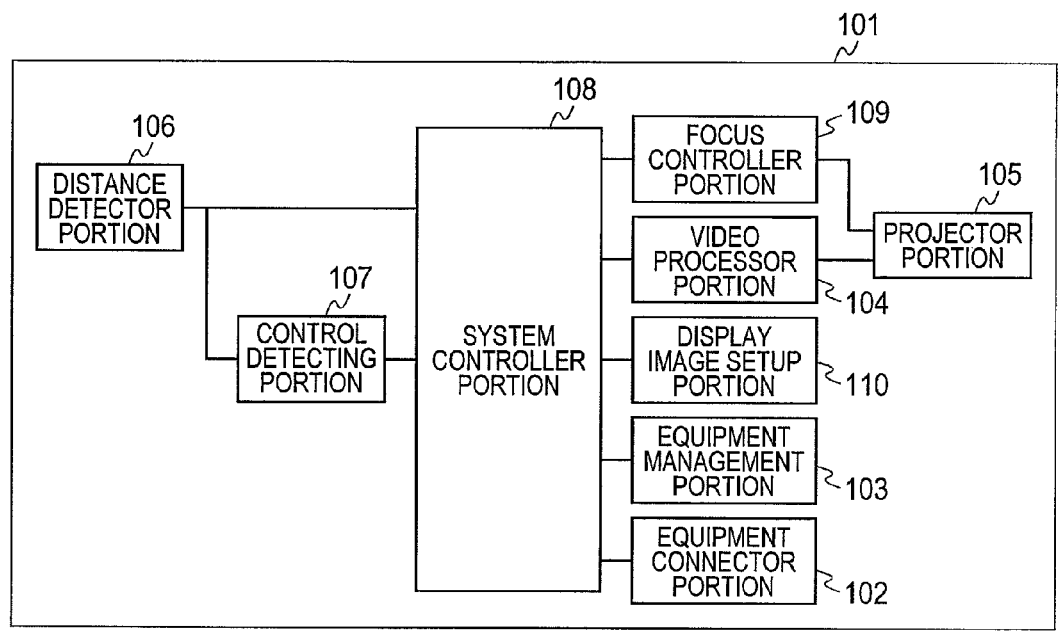
FIG. 1 is a block diagram for showing an example of the structure of an operation controlling apparatus, according to an embodiment 1 of the present invention.
Figure 2:
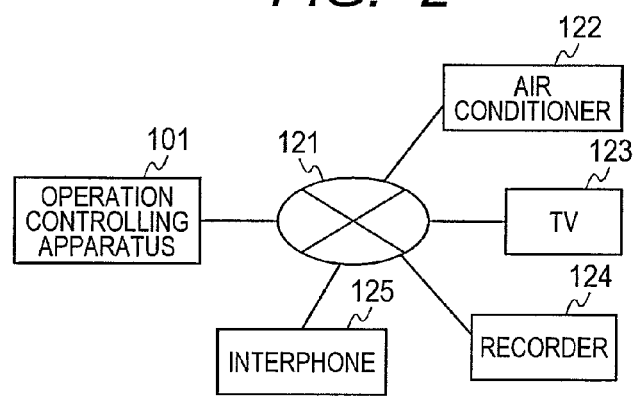
FIG. 2 is a view for showing an example of connection of control equipments, according to the embodiment 1.

FIG. 1 is a block diagram for showing an example of the structure of an operation controlling apparatus according to a present embodiment. A reference numeral 101 depicts the operation controlling apparatus for controlling equipments, such as, a TV, etc., and 102 an equipment connector portion to be connected with target equipment(s) of control (hereinafter, being called "control target equipment(s)"). In FIG. 2 is shown an example of connection with the control target equipment. 121 depicts a network within a home (hereinafter, being called "an in-home network"), to which the operation controlling apparatus 101 is connected, for example, wherein to the network within a home is connected the household equipments, such as, an air conditioner 122 and/or a TV 123, a recorder 124, an interphone 125, etc. The operation controlling apparatus 101 controls those control target equipment(s), through the equipment connector portion 102 and the in-home network 121. However, the household equipments are only an example, but also it can control other equipments than the target equipments of control. Also, the equipment connector portion 102 may be a wireless network connecting means, or in the place of the in-home network 121, it may be a remote controller, which can transmit a control signal(s) for one (1) set or more numbers of equipments through infrared rays or radio waves, or a remote controller connecting means, etc.

A reference numeral 103 depicts an equipment management portion for managing the control target equipment(s), which is/are connected to the equipment connector portion 102, and control information of the control target equipment(s). An example of the control information, which is managed by the equipment management portion 103, is shown in FIG. 8. A reference numeral 801 depicts a name of the control target equipment(s), 802 an ID for managing the control target equipment, uniquely, and 803 information necessary for connecting with the control target equipment(s), for example, an IP address, a password, etc. 804 depicts a selection order of operation of the control target equipment(s), designating such an order, for example, that the control target equipment having the smallest number is made operable when an operator starts the operation, and when the operator instructs an operation of a next control target equipment, the control target equipment having the next smallest number of the selection order is made operable, etc. 805 depicts a control item name for each control target equipment, 806 an ID for managing the control items, and 807 a control command for executing the control item. 808 depicts a condition of the control target equipment, on which the control item can be operated, for example, assuming that the condition where a power source is turned "ON" is "001", "CH up", "CH down", etc., are operable, but when the power source is turned "OFF", only "power source ON" is the control item of being operable. Further, the equipment management portion 103 may manage other(s) than the control information, which is explained by referring to FIG. 8, and also, the numbers or the like used in the explanation are only an example, but they may be other numbers or marks or the like, as far as the management can be achieved.

Figures 5, 6:
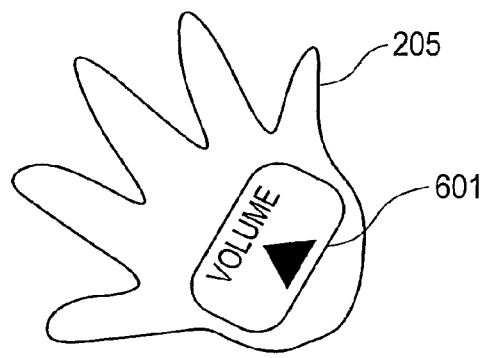
FIG. 5 is a view for showing an example of a projection image of the operation controlling apparatus, according to the embodiment 1.
FIG. 6 is a view for showing an example of a projection image of the operation controlling apparatus, according to the embodiment 1.

A reference numeral 110 depicts a display image or picture setup portion for producing or setting up a screen image to be projected, for example, it produces screen images corresponding to the control items of the control target equipments, which are managed within the equipment management portion 103, and set up one (1) piece of the screen image among of them as a projection image. In FIG. 5 is shown an example of the screen image, for example, for the TV. The screen image is produced corresponding to each of the control items, and for example, for "channel up" is produced a screen image 501, for "channel down" a screen image 502, for "volume up" a screen image 503, for "volume down" a screen image 504, and for "power source OFF" a screen image 505, respectively. Also, there may be displayed a message 506 for noticing that it is outside of an operation region of the control item, and it does not matter to display an operating method, or an image, such as, a logo mark, etc. However, the screen image may be produced in the display screen setup portion 110, or may be used a screen image, which is produced for each control item in advance.

A reference numeral 104 depicts a video processor portion for producing the projection screen by brining a video image setup within the display screen setup portion 110 into a video signal, and 105 a projector portion for projecting the video from the video processor portion 104.

A reference numeral 106 depicts a distance detector portion for detecting the distance between a projection surface, on which the video projected by the projector portion 105 is displayed, and the operation controlling apparatus 101. As a method for detecting the distance, for example, there may be applied any kind of method, as far as it can measure the distance, such as, measuring the distance with using an infrared ray or an ultrasonic wave, or measuring the distance with using an image photographed by a camera, or using the both, etc.

A reference numeral 107 depicts a control determining portion for analyzing changes of the distance, which is measured by the distance detector portion 106, and determining execution of the control item upon basis of a result of detecting the movement of the projection surface, etc.

A reference numeral 108 depicts a system controller portion for controlling and managing the operation controlling apparatus 101, and it determines the control item of the equipment to be a control target from the distance, which is detected by the distance detector portion 106, and the control information, which is managed within the equipment manager portion 103, and further decides the control item from the analysis result of a control determining portion 107 and the control information, which is managed within the equipment manager portion 103; thereby conducting the processes, such as, informing the control command to the equipment, i.e., the control target, through the equipment connector portion 102. Also, a reference numeral 109 depicts a focus control portion for executing the focus control of an image projected by the projector portion 105, and the system controller portion 108 sets up the focus control portion 109 in such a manner that the focus comes into at the distance, which is detected by the distance detector portion 106.

Figure 3A:
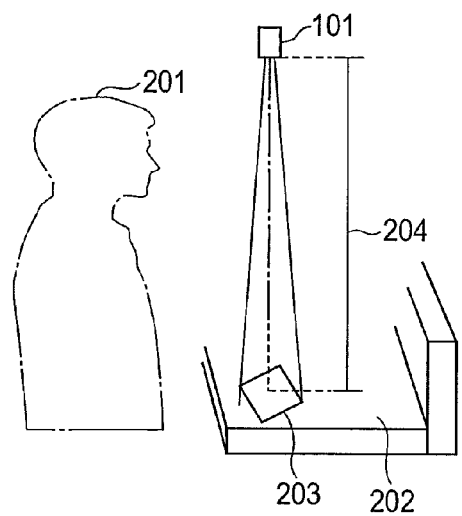
FIGS. 3A and 3B are views for showing an example of the operation controlling apparatus, according to the embodiment 1.
Figure 3B:
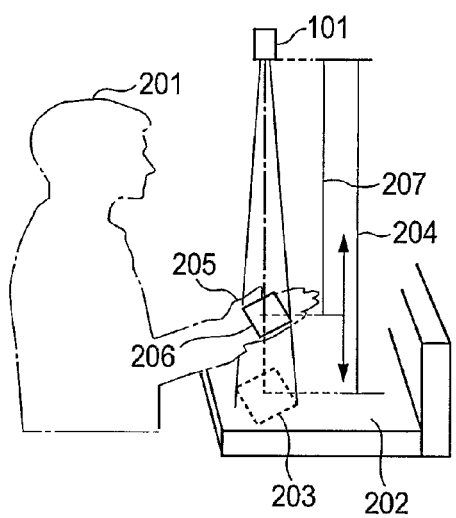

A schematic drawing of operations of the operation controlling apparatus according to the present embodiment is shown in FIGS. 3A and 3B. The same ones to those shown in FIG. 1 are attached with the same reference numerals. A reference numeral 201 depicts an operator who operates the control target equipment through the operation controlling apparatus 101, wherein FIG. 3A shows an example of the condition where the operator does not enter her/his hand(s) into a projection area or region of the operation controlling apparatus 101, and FIG. 3B shows an example of the condition where the operator 201 her/his hand(s) into the projection region. 202 depicts a projection surface of the operation controlling apparatus 101, such as, a floor or a stand, etc., 203 depicts an image projected on the projection surface 202, and 204 depicts the distance from the operation controlling apparatus 101 and the projection surface 202. Also, 205 depicts a palm of the operator 205, 206 depicts an image, which the operation controlling apparatus projects on the palm 201, and 207 depicts the distance from the operation controlling apparatus 101 to the projection surface, i.e., the palm 205 of the operator 201. The operation controlling apparatus 101 measures the distance 207 up to the palm 205 of the operator 201 by means of the distance detector portion 106, so as to select the corresponding control item depending on the distance, and projects the image or picture corresponding to the control item selected. The operator exchanges the control item of the control target equipment and the image thereof by bringing up or down her/his palm(s) while watching the image projected on her/his palm 205.

Explanation will be given on the correspondences between the distances 205 from the operation controlling apparatus 101 and the control items.

Figure 4:
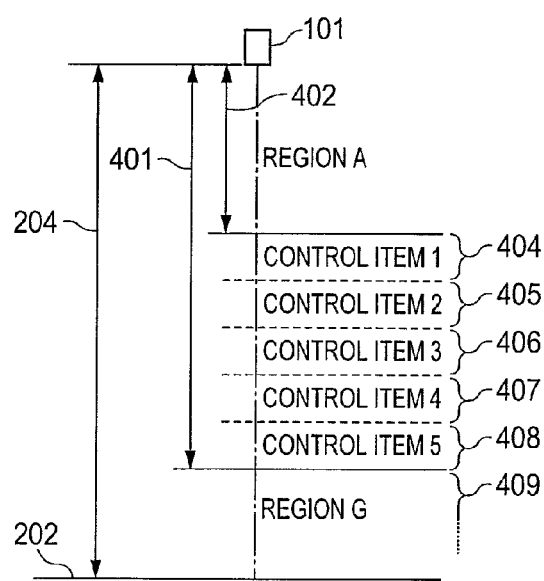
FIG. 4 is a view for showing an example of division of image display regions of the operation controlling apparatus, according to the embodiment 1.

An example of division of display areas or regions, which are assigned for selecting the control items, is shown in FIG. 4. The same ones to those shown in FIGS. 1 and 3A and 3B are attached with the same reference numerals. A reference numeral 401 shows the maximum distance for determining that the operator enters her/his hand(s), and in case where the distance detected by the distance detector portion 106 is equal to or greater than the distance 400, the operation controlling apparatus 101 projects the image, which is same to the image projected on the projection surface 202, such as, the floor or the stand, etc. 402 depicts such distances, i.e., being too close to the operation controlling apparatus 101, so as to bring the projection image into focus, or being too high for the operator to operate, and therefore those are removed from the control items. Setup values of the distances 401 and 402 are determined, in advance, depending on the specification of a projector portion of the operation controlling apparatus 101, or on a place where the operation controlling apparatus 101 is set up. Further, this may be determined by taking the height of the operator into the consideration thereof.

The regions from the distance 402 to the distance 401 are assigned to the control items of the equipment to be operated. Reference numerals from 404 to 408 depict the regions, each to be assigned to the control items, respectively, in case of controlling five (5) sets of the items, and 409 depicts a region out of a control item setup region where it should be determined that the operator does not enter her/his hand(s). The operation controlling apparatus 101 detects in which area the projection surface lies, from the region 404 to the region 409, and displays a screen corresponding to each region. The operator 201 can select the control item by moving her/his palm(s) 205.

Explanation will be given on the case where the five (5) sets of the control items are assigned to the regions, respectively, within an example of the TV shown in FIG. 5. When the operator 201 wishes to rise up the volume, she/he holds her/his hand(s) at the height of the region 406. The operation controlling apparatus 101 detects the distance up to the projection surface, i.e., the palm(s) 205, by means of the distance detector portion 106, and determines that the projection surface lies at the position of the region 406, and thereby projecting a screen image 503 corresponding to the control item "volume up", i.e., the control item 3. FIG. 6 shows an example of the image, which is projected on the palm 205 of the operator. The screen image 503 projected is displayed on the palm 205 of the operator 201. When the operator holds her/his hands up and down, thereby changing the regions, the operation controlling apparatus 101 projects the screen corresponding to each of the regions. As was explained in the above, the operator can recognize the item to be controlled by watching the image projected. However, although the explanation was med that the projection surface lies on the palm(s) 205 of the operator, but anything can be applied other than that, such as, a part of a body or a stuff, as far as the operator can watch and the image can be projected thereon.

Figure 7:
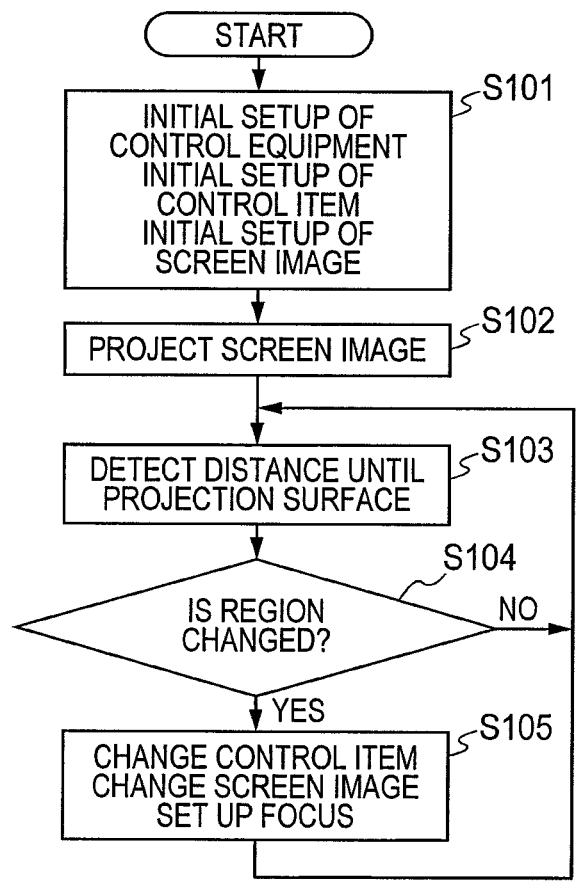
FIG. 7 is a view for showing an example of a processing flow of the operation controlling apparatus, according to the embodiment 1.

An example of processing flow of control item setting up within the operation controlling apparatus 101 is shown in FIG. 7.

The processing within the operation controlling apparatus 101 is started, for example, when the operator brings her/his hand(s) come(s) close to a non-contact switch using infrared rays, etc., or moves it/them.

A step S101 is an initial setup, wherein selection is made on equipment to be a control target among from the equipments connected, and division of the region is made depending on the number of the control items of the equipment selected; for example, as an initial region is set up a region G409 other than the control item setup, since it is before the time when the selection is made on the control items. In a step S102, an initial screen image is projected. Herein, the initial screen image to be projected may be such a screen image that the operator 201 can understand the operation controlling apparatus 101 is brought into an operable condition; however, it is also possible to notice the operator 201 of an operating method, through displaying such a message as shown by 506 in FIG. 5, for example.

In a step S103, detection is made of the distance up to the projection surface, with using the distance detector portion 106 shown in FIG. 1. In the step S103, comparison is made between the detected distance up to the projection surface and the regions already set up, and if they differ from, the control item is changed, and thereby conducting a setup of the screen image corresponding to the control item, and a setup of focus within a focus controller portion 109. Thereafter, the steps 103 to 105 are repeated, and thereby conducting exchanging of the projection surface and the control item, responding to holing up and down of her/his hand(s) of the operator.

Next, explanation will be given on an example of the method for executing the control item selected.

Figure 9:
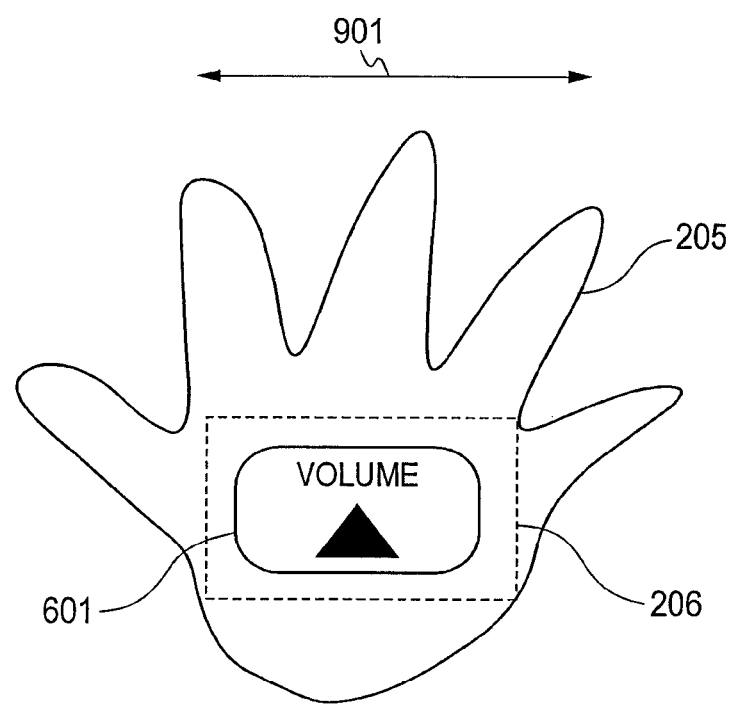
FIG. 9 is a view for showing an example of a user operation, according to the embodiment 1.
Figure 10:
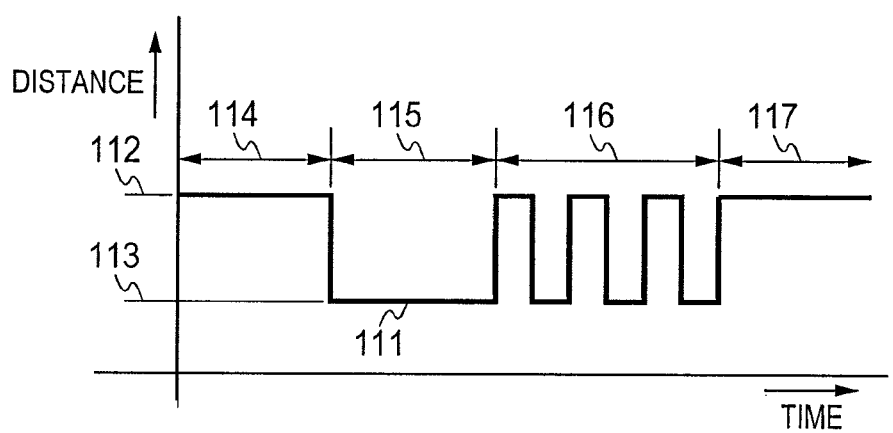
FIG. 10 is a view for showing an example of an output waveform of a position detector portion.

FIG. 9 shows an example of an operation made by the operator, for executing the control item selected. The same ones to those shown in FIG. 6 are attached with the same reference numerals, and the explanations thereof will be omitted. A reference numeral 901 depicts a control execution direction, into which the operator 201 moves her/his palm(s) 205 for executing the control item selected. The operator 201 puts her/his palm(s) in a certain region, and after determining the control item, she/he waves her/his palm(s) 205 into the control execution direction, continuously. The example in FIG. 9 shows the case where the control execution direction is the horizontal direction (i.e., the left and the right). An example of waveform of an output from the distance detector portion 106 in this instance is shown in FIG. 10. The horizontal axis presents time, while the vertical axis the distance, which is detected by the distance detector portion 106, and wherein a reference numeral 111 shows the waveform when the operator moves her/his hand(s). 112 depicts the distance from the operation controlling apparatus 101 up to the floor or the stand, etc., and 113 the distance from the operation controlling apparatus 101 up to the palm(s) 205. 114 depicts a condition or state where the operator 201 does not operate, during a certain time-period when the projection surface lies on the floor or the stand, etc. 115 depicts a condition or state where the operator 201 enters her/his palm(s) 205 into the projection region, for operating the control target equipment. 116 is a period during when the operator 201 moves her/his palm(s) into the control execution direction for executing the selected item. This shows a condition or state how the distance, which is detected by the distance detector portion 106, appears, alternately, between the distance up to the floor or the stand, etc., and the distance up to the palm(s) 205. Hereinafter, explanation will be given about an operation flow with using the distance detector portion 106 shown in FIG. 10.

Figure 11:
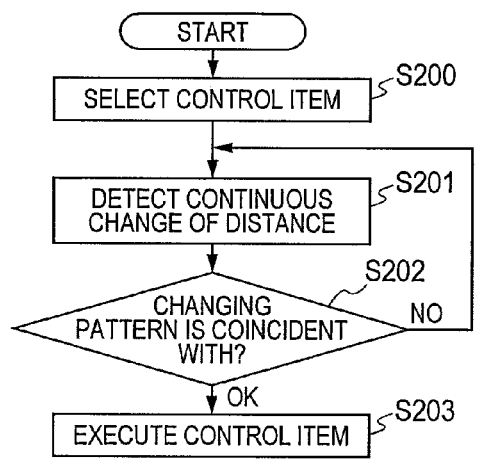
FIG. 11 is a view for showing an example of a processing flow of the operation controlling apparatus, according to the embodiment 1.

FIG. 11 shows an example of the operation flow for processing to execute the control item displayed.

In a step S200, upon determining that the control item is selected in 111 shown in FIG. 10, the control item is set up. In a step S201, detection is made upon continuous changes of the distance, as is shown by 116 in FIG. 10, from an output from the distance detector portion 106, by means of the control determining portion 107 of the operation controlling apparatus 101. In a step S202, if determining that the continuous changes are coincident with a pattern of the changes of distance, which is registered in advance, it is so acknowledged that the operator makes a movement for executing the control item, and in a step S203, the control item is executed. As such movement coincident with the pattern of the changes of distance, which is registered in advance, may be as follows; for example, as was explained in FIGS. 9 and 10, the operator waves her/his hand(s) to the left and the right or up and down, or alternately, other(s) in the place of the palm(s) may be moved. Execution of the control item is conducted by the operation controlling apparatus 101, transmitting an execution command, etc., corresponding to the control item, to the operation target equipment.

As was explained in the above, with the operation controlling apparatus according to the present embodiment, for the operator, it is possible to select and execute the control item, with a simple movement or action, such as, holding or waving her/his hand(s) to the left and the right or up and down, without touching on a remote controller, etc., and thereby enabling the equipment control easily.

<Embodiment 1>

Figure 12:
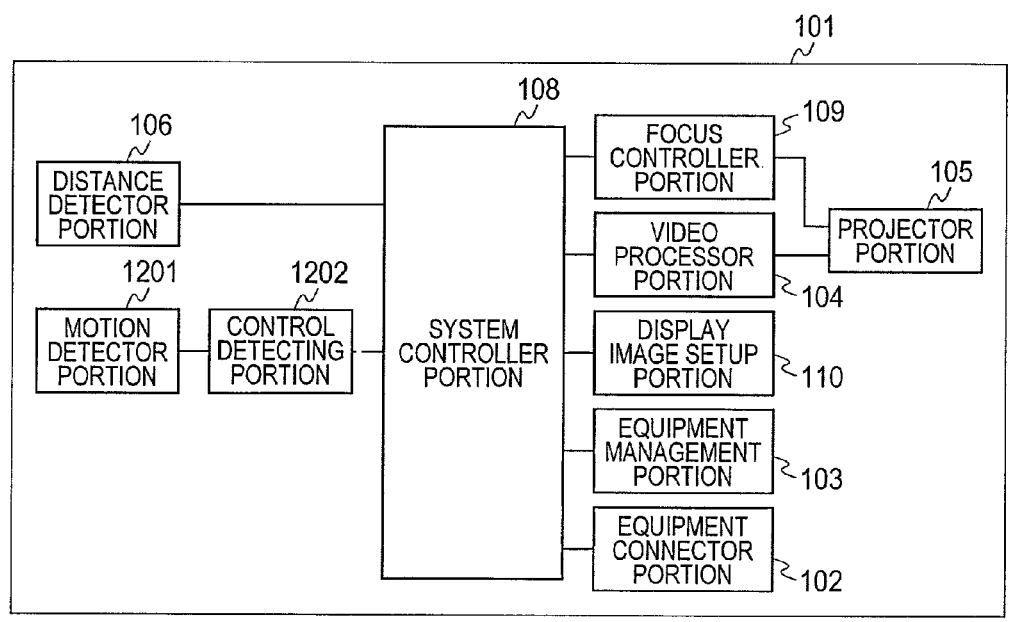
FIG. 12 is a block diagram for showing an example of the structure of an operation controlling apparatus, according to an embodiment 2 of the present invention.

FIG. 12 is a block diagram for showing an example of the structure of the operation controlling apparatus according to the present embodiment. The difference between the embodiment 1 leis in that it is possible to execute plural numbers of operations from one (1) piece of the control item. The same ones to those shown in FIG. 1 are attached with the same reference numerals, and the explanations thereof will be omitted. A reference numeral 1201 depicts a motion detector portion for detecting the motion or movement of an object. The motion detector portion 1201 can be constructed, cheaply, for example, with a moving direction detecting sensor, combining plural numbers of pyroelectric-type infrared sensors. Or, with applying an image sensor or a camera, etc., it is also possible to conduct a much larger number of operations by using a manner of the movement and/or a position of the movement, not only the direction of the movement. 1202 depicts a control determining portion for analyzing the direction of movement of the palm, etc., from an output of the motion detector portion 1201, and thereby determining execution of the operation, wherein the movement of the object is detected upon basis of a waveform of the output or an image from the motion detector 1201.

FIG. 13 shows an example of operations made by the operator. This FIG. 13 shows the example where the control item of channel-down for TV is projected, but the same ones to those shown in FIG. 9 are attached with the same reference numerals, and the explanations thereof will be omitted. A reference numeral 231 depicts an example of a projection image or picture of the control item of the channel-down for TV. 232 depicts an example of the image for showing a direction, into which the control will be execute, i.e., for example, it is indicated that the control item is executed if the palm 205 moves to the right. 233 depicts an example of the image for showing a direction, into which the equipment will be selected, i.e., for example, it is indicated that the operation target equipment is changed if the palm 205 moves to the left. 234 depicts the palm when the palm 205 moves into the right direction, while 235 depicts the palm when the palm 205 moves into the left direction, wherein there is shown a condition that nothing is projected on the palm 234 and the palm 235, because it comes out from the projection position in both cases.

Figure 15:
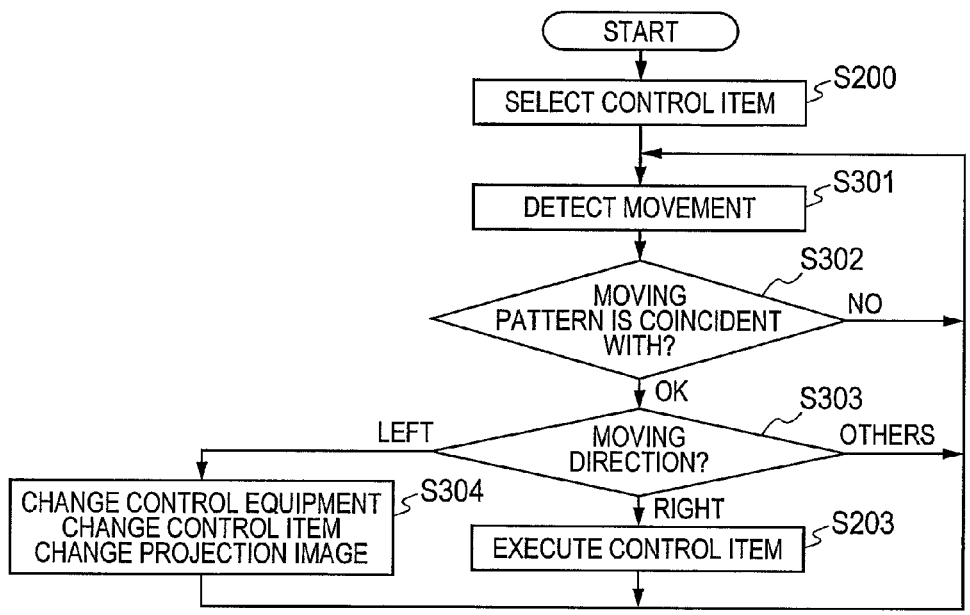
FIG. 15 is a view for showing an example of a processing flow of the operation controlling apparatus, according to an embodiment 3 of the present invention.

FIG. 15 shows an example of a operation flow when the operation controlling apparatus detects the movement. The same ones to those shown in FIG. 10 are attached with the same reference numerals, and therefore the explanations thereof will be omitted, herein. In a step S301, if the operator 201 moves her/his palm 205 to the right, when the motion detector portion 1201 is in the condition of detecting the movement, then in a step S301, it is detected that the movement is made. In a step S302, it is determined if there is a registered motion pattern or not, beings coincident with that, which is detected in the step S301. If determining that there is one being coincident with in the step 302, then in a step S303, the control determining portion 122 detects the fact that the palm of the operator moves to the right, and delivers it to the system controller portion 108. In a step S203, the control item is executed; i.e., transmitting a control command of channel-down to the TV, if it is the channel-down of TV, for example.

Also, if the operator 201 moves her/his palm 205 to the left, then in the step S303, the control determining portion 122 informs the fact that the palm of the operator moves to the left, to the system controller portion 108. In a step S304, the system controller portion 108 selects the equipment and the control items thereof, to be displayed next, from among the control target equipments, which are connected with the operation controlling apparatus 101, and determines a new projection image in the display screen setup portion 110. FIG. 14 shows an example of the image projected. The same ones to those shown in FIG. 13 are attached with the same reference numerals, and therefore the explanations thereof will be omitted, herein. This FIG. 14 shows the case where the operator 201 turns her/his palm 205 back into the projection position of the projection image of the operation controlling apparatus 101, after moving her/his palm to the left once. A reference numeral 241 depicts an example of the projection image of the control item for lowering down the temperature of an air conditioner, wherein the equipment to be controlled is changed from the television receiver to the air conditioner 122, and the control item is changed to the control item for the air conditioner 122. The operator 201 can execute controlling of the air conditioner and/or changing of the equipment to be controlled by moving her/his palm to the left or the right, under this condition, in the similar manner to that shown in FIG. 13.

With such operation controlling apparatus according to the present embodiment, which was explained in the above, for the operator, it is possible to execute the operations of the equipments, without touching on the equipments. Further, although the explanation was given about the example of moving the palm to the left or the right, in the present embodiment; however, the control of the equipments may be made through detection of the movement towards up or down. Also, in case where the direction into which the operator moves her/his palm is already known, the image relating to the direction to be moved and the operation thereof may be omitted, thereby simplifying the image projected thereon.

<Embodiment 3>

Figure 16:
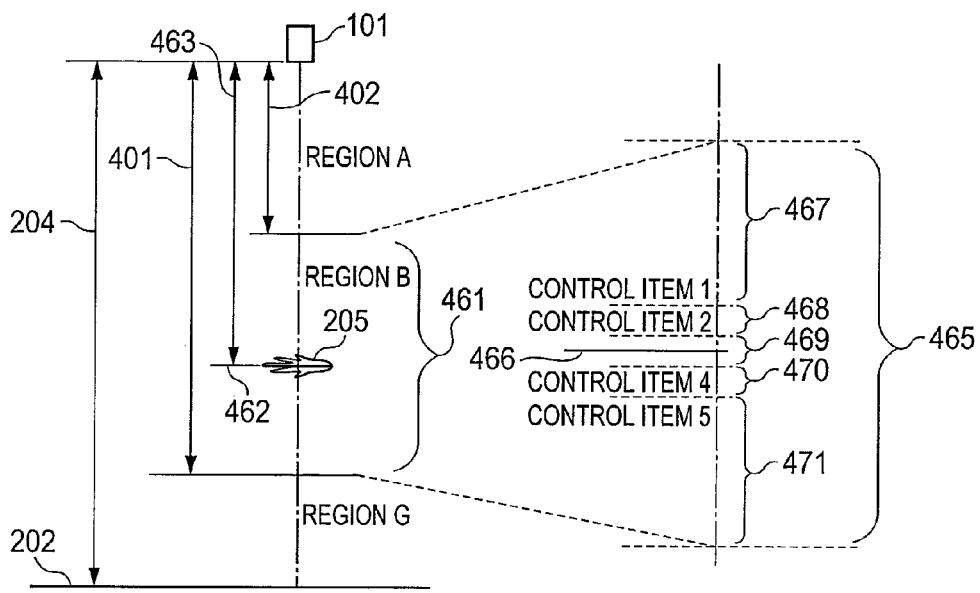
FIG. 16 is a view for showing an example of division of image display regions of the operation controlling apparatus, according to the embodiment 3.

FIG. 16 shows an example of division of the display region of the operating controlling apparatus according to the present embodiment. The present embodiment is other example of the method for dividing the display region, in the operation controlling apparatus of the embodiment 1 or 2. The same ones to those shown in FIG. 4 are attached with the same reference numerals, and therefore the explanations thereof will be omitted, herein. A reference numeral 461 depicts a usable region (a region B) excluding a region G below distance 401, which is considered to be a background, and a region A closer than distance 402, 462 depicts a reference surface, on which the operation controlling apparatus 101 detects the distance at first, when the user enters her/his palm 205 into the projection surface of the operation controlling apparatus 101 firstly, and 463 depicts the distance from the operation controlling apparatus 101 to the reference surface 462. 465 depicts an enlarged view of 461 for the purpose of explanation, and 466 depicts the reference surface. Those from 467 to 471 depict examples of regions, which are assigned corresponding to the control items around the reference surface 466, i.e., there are shown an example for controlling five (5) sets of control items. Heights and widths of 467 to 471 are determined depending on the number of the control items and the height of the reference surface 466.

Figure 17:
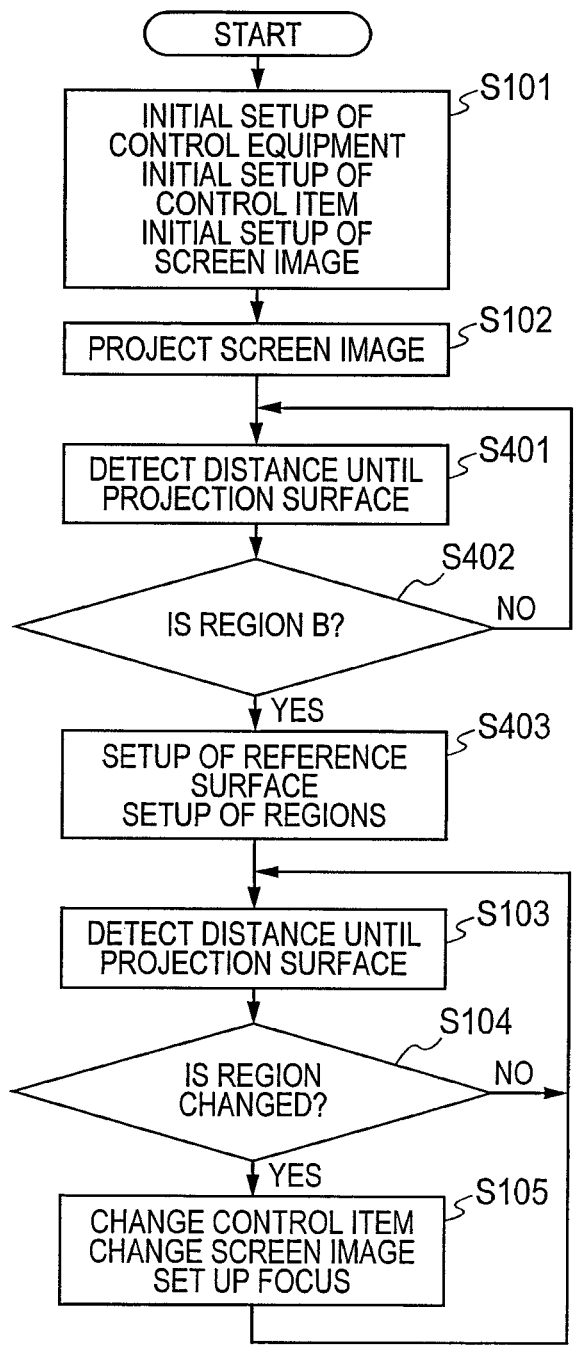
FIG. 17 is a view for showing an example of the processing flow of the operation controlling apparatus, according to the embodiment 3.

FIG. 17 shows an example of a processing flow of the operation controlling apparatus. The processes, which are same to those shown in FIG. 7, are attached with the same reference numerals, and therefore the explanations thereof will be omitted, herein. After displaying the screen in the step S102, in a step S401 is detected the distance up to the projection surface. In a step S402, if the distance detected in the step S401 is within the usable region (the region B), determination will be made of the regions corresponding to the control items to be set up, one by one, around the reference surface 462. Hereinafter, the operator holds her/his palm up and down, and thereby, as was explained in FIG. 7, the steps from S103 to S105 will be repeated, and then the operator selects the desired control items, one by one.

With the present embodiment, since the control regions are set up around the reference surface, which the operator determines, it is possible to obtain the operation controlling apparatus, which can be used by the operator, easily, in spite of the height of herself/himself.

However, the control items, which are set up in the region including the reference surface, may be the control items having high frequency of use, for the purpose of easy operation by the user, or may be the control items, which are used previously.

<Embodiment 4>

Figure 18:
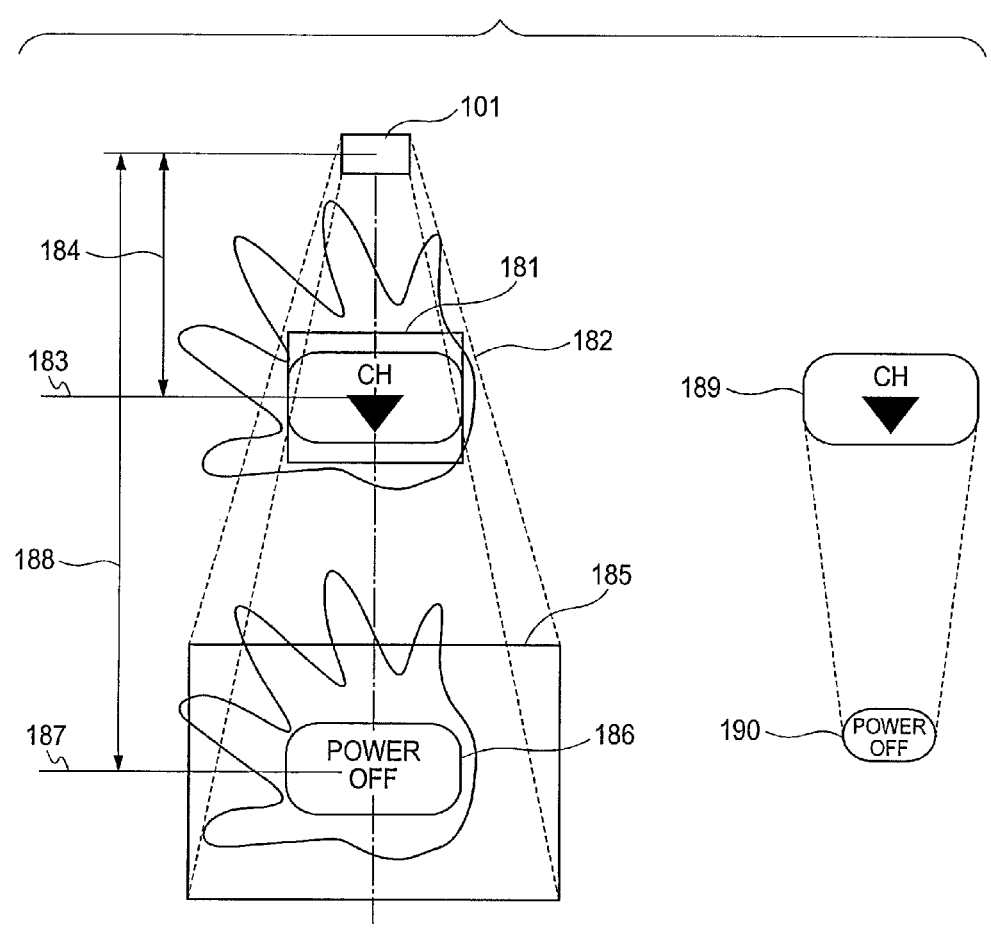
FIG. 18 is a view for showing an example of a projection image of the operation controlling apparatus, according to an embodiment 4 of the present invention.

FIG. 18 shows an example of a projecting method of the operation controlling apparatus. The present embodiment is an embodiment other than that shown in the embodiment 1 or the embodiment 2. Reference numerals from 183 to 187 depict the heights of the projection images, 184 depicts the distance from the operation controlling apparatus 101 down to the height 183 of the projection image, and 188 depicts the distance from the height of the operation controlling apparatus 101 down to the projection image 187. 181 shows the projection image as a whole when the palm 205 lies at the height 183, and 185 shows the projection image as a whole when the palm 205 lies at the height 187, respectively. 189 and 190 show the screen image after being projected. Since the operation controlling apparatus 101 display the image by projecting, because of the function of a lens, the farther the distance separating from the operation controlling apparatus 101, the larger the image projected thereon, as is projected onto the height 187 far from the operation controlling apparatus 101, and therefore, it is possible to put the picture image 190 on the palm within the area thereof, by reducing the size thereof smaller than the picture image 189.

Figure 19:
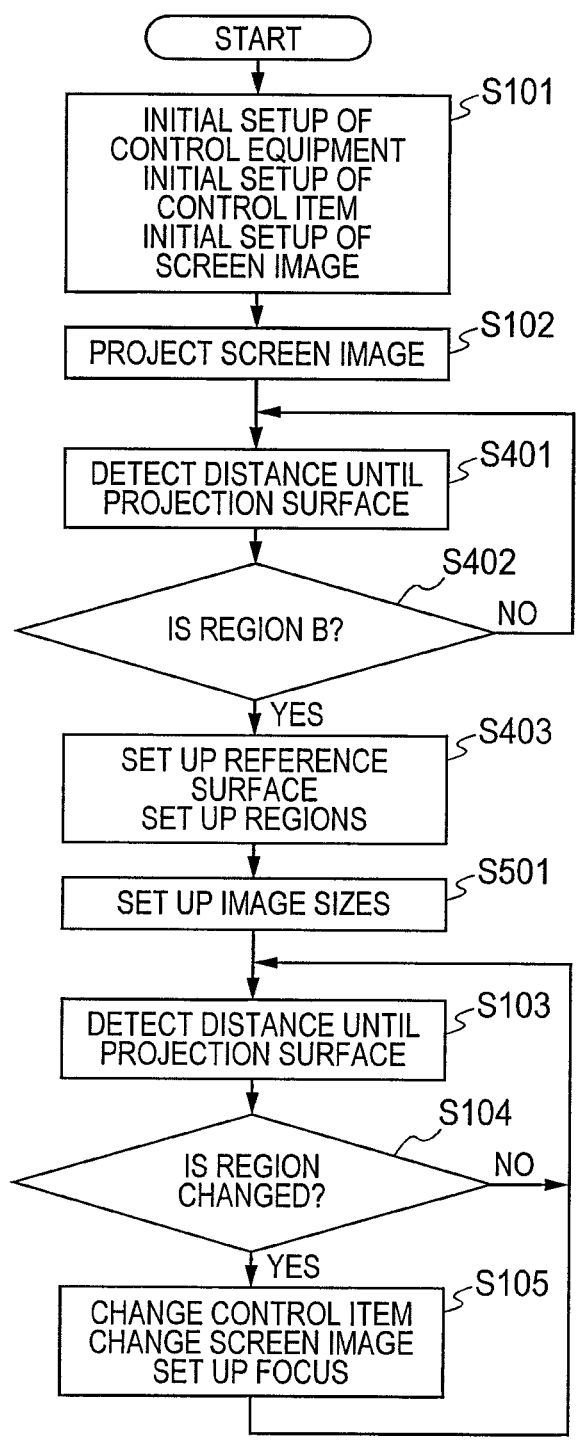
FIG. 19 is a view for showing an example of the processing flow of the operation controlling apparatus, according to the embodiment 4.

FIG. 19 shows an example of a processing flow of the operation controlling apparatus. The same ones to those shown in FIG. 17 are attached with the same reference numerals, and therefore the explanations thereof will be omitted, herein. In a step S403, the reference surface and the regions are determined, and also each of the regions is determined the picture images to be projected in a step S501. Sizes of the image are determined from the distance from the operation controlling apparatus 101 to the region where the projection is made, and also a projection angle thereof. Hereinafter, similar operations to those shown in FIG. 17 will be conducted.

With the present embodiment, for the operator, it is possible to let the picture image corresponding to the control item to be projected on her/his palm, irrespective of the height of the palm, and thereby to confirm the control content by watching the image projected thereon.

<Embodiment 5>

Figure 20:
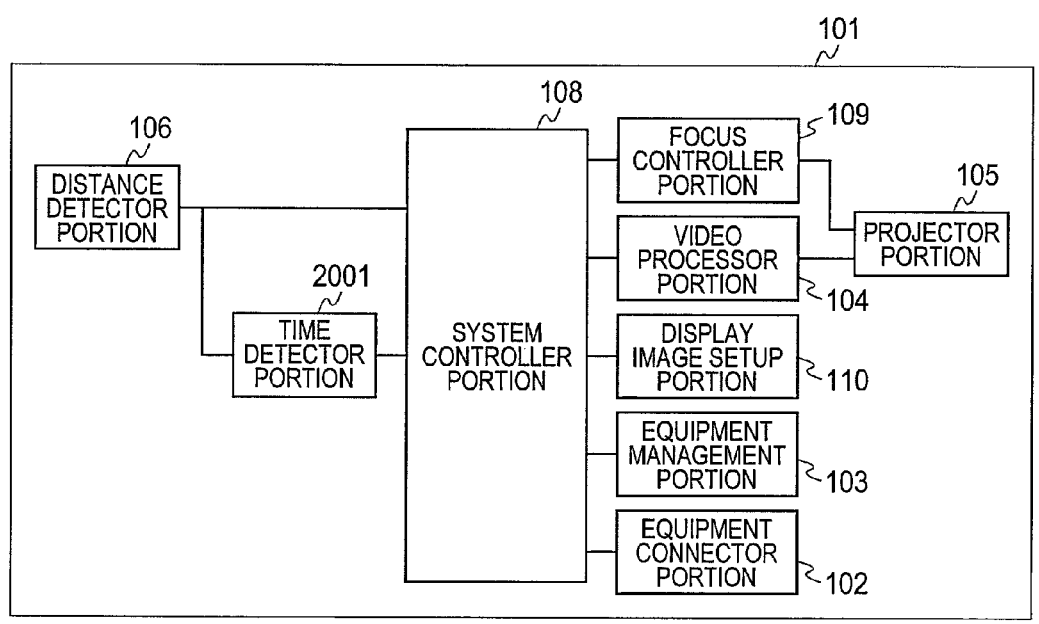
FIG. 20 is a block diagram for showing an example of the structure of an operation controlling apparatus, according to an embodiment 5 of the present invention.

FIG. 20 is a block diagram for showing an example of the operation controlling apparatus according to the present embodiment. The difference from the embodiment 1 or the embodiment 2 lies in that determining the execution of the control item is made depending on an elapsed time-period.

The same ones to those shown in FIG. 1 are attached with the same reference numerals, and therefore the explanations thereof will be omitted herein. In an element of a reference numeral 2001, measurement is made on the time-period during when the output of the distance detector portion 106 lies before a background, and if it lies at the same distance or in the same region, within the regions explained in FIG. 4 or 16, for a time-period being equal to or larger than that, which is determined in advance, this is noticed to the system controller portion 108.

Figure 21:
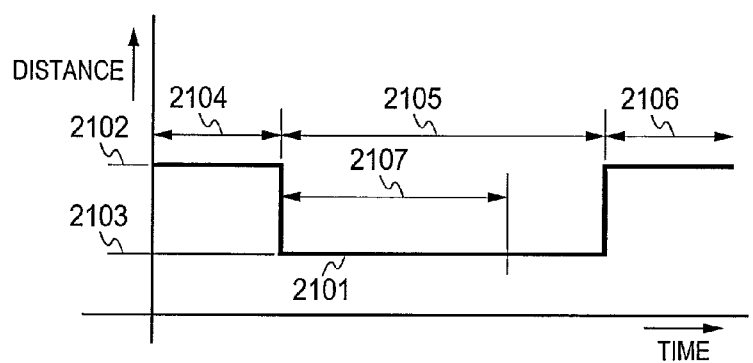
FIG. 21 is a view for showing an example of an output waveform of a position detector portion.

FIG. 21 shows an example of the waveform of an output of the distance detector portion according to the present embodiment. A reference numeral 2101 depicts the example of the waveform of the output of the distance detector portion, 2102 depicts a distance from the operation controlling apparatus 1010 to the background, 2103 depicts a distance from the operation controlling apparatus 1010 to the background when the palm or the like is entered, 2104 and 2106 depict time-periods during when the projection surface is the background, 2105 depicts a time-period during when the projection surface is the palm or the like, but not the background, and 2107 depicts a time-period until when the control item is executed, respectively. After selecting the control item, the operator stays her/his palm at the height thereof or within the region of the control item she/he selects, for a time-period being equal to ore more that the predetermined time-period 2107, and thereby executes the control item.

According to the present embodiment, for the operator, it is possible to control the equipment by staying her/his palm at a certain height for a predetermined time-period.

<Embodiment 6>

Figure 22:
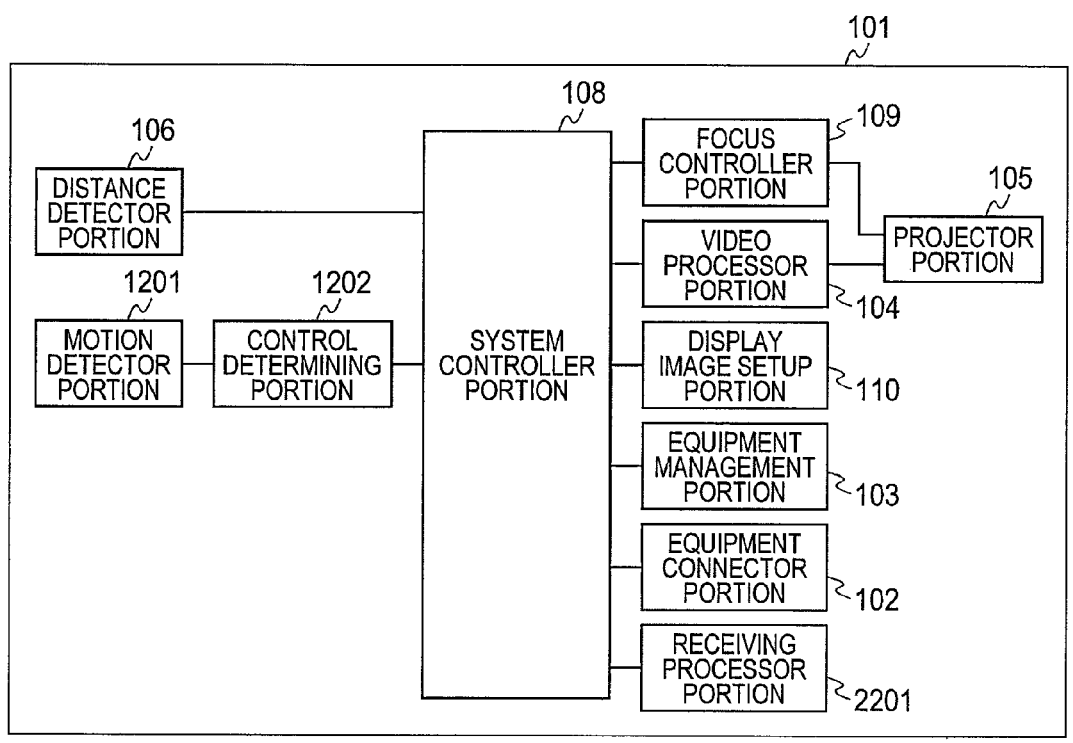
FIG. 22 is a block diagram for showing an example of the structure of an operation controlling apparatus, according to an embodiment 6 of the present invention.

FIG. 22 is a block diagram for showing an example of the structure of the operation controlling apparatus according to the present embodiment. The difference from the embodiment 1 or the embodiment 2 lies in an operation starting method for starting the operation upon a notice from the target equipment of being the operation control. The same ones to those shown in FIGS. 1 and 13 are attached with the same reference numerals, and therefore the explanations thereof will be omitted herein. A reference numeral 2201 depicts a receiving processor portion for receiving the notice from the control target equipment, and this notices the control target equipment received and information of the control item to the system controller portion 108. The system controller portion 108 notices the display screen setup portion 110 to project a picture image corresponding to the control target equipment and the control item, which are noticed. Hereinafter, since they are same to those shown in FIG. 13, the explanations thereof will be omitted.

Figure 23:
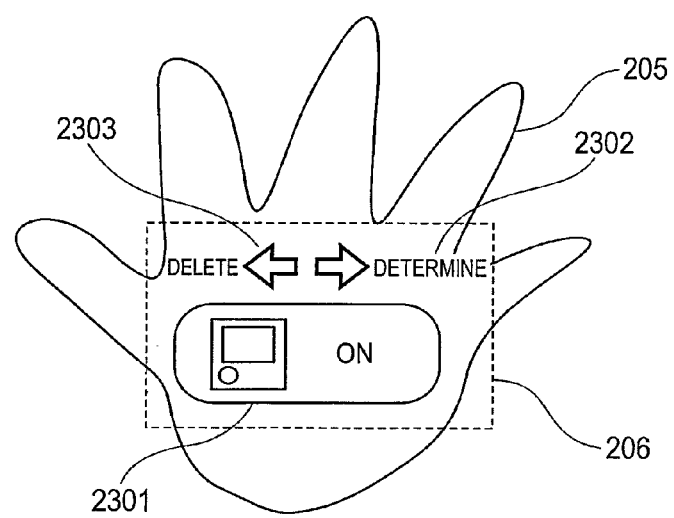
FIG. 23 is a view for showing an example of a projection image of the operation controlling apparatus, according to an embodiment 6 of the present invention.

FIG. 23 shows an example of the projection image. It is an image to be projected, for example, when a visitor pushes an interphone 125. A reference numeral 2301 depicts the screen image projected, and 2302 and 2303 depict directions for recognition of operations, respectively. Upon projection of the image, the operator knows that the notice is given from the control target equipment, and by moving her/his palm into the direction of 2302 or 2303, and she/he decides a processing method for the notice. For example, if she/he moves her/his palm into the right direction, then a control command of "determine" is transmitted to the interphone. The interphone brings 125 brings a speaker and a microphone, etc., which are connected to the interphone 125, into ON conditions thereof, so that the operator can make conversation with the visitor.

Figure 24:
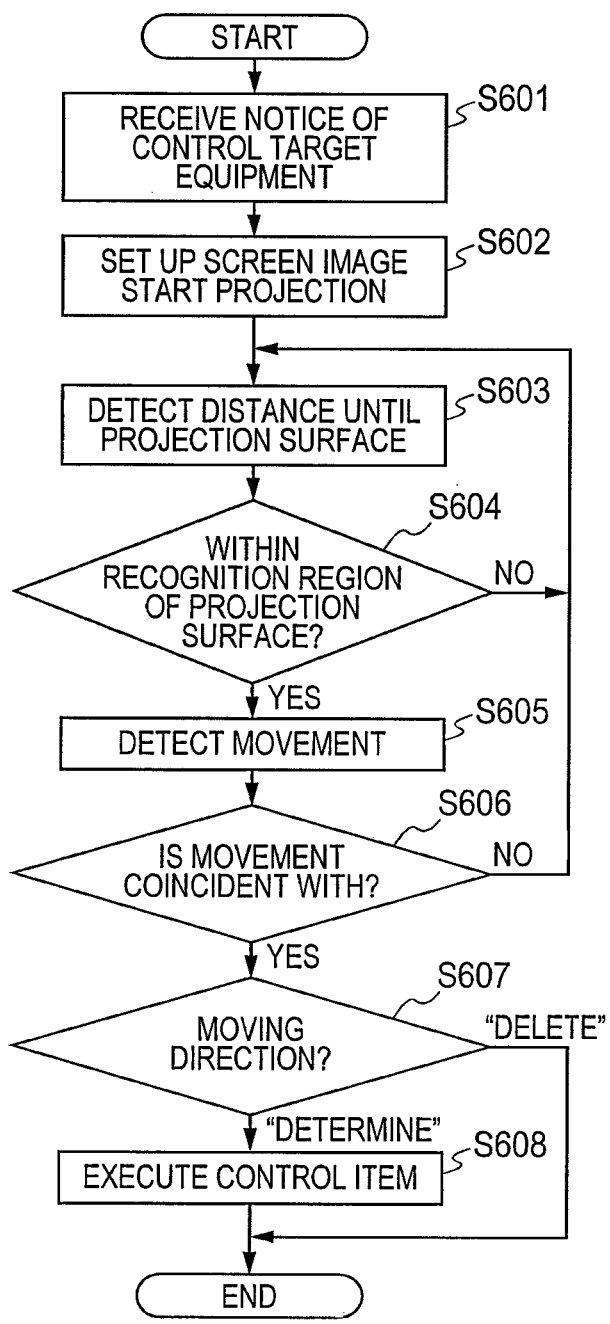
FIG. 24 is a view for showing an example of the processing flow of the operation controlling apparatus, according to the embodiment 6.

FIG. 24 shows an example of a processing flow of the operation controlling apparatus according to the present embodiment. When receiving the notice from the control target equipment in a step S601, the operation controlling apparatus 101 projects a screen image to be projected in a step S602, judging from the control target equipment and the control item, which are noticed, and starts detection of the distance to the projection surface in a step S603. In a step S604, if the projection surface is not within the region for detecting the movement, for example, within the distance until a rear surface, it turns back to the step S603, and thereby repeats detection of the distance. Herein, if the operator 201 who looks at the image for detection of the distance enters her/his hand into the projection surface, it determines that the hand is within a region of operation recognition in a step S604, and then starts detection of the movement in a step S605. In a step S606, if the movement detected is not coincident with the movement that is determined in advance, it turns back to the detection of movement in the step S605, while the movement is coincident with that, it determines which one of the movements it is, in a step S607. For example, in case where the movements are assigned to "determine" and "delete", it ends the process is when the movement of "delete" is recognized. Or, when the movement of "determine" is recognized, it advances into a step S608, wherein it transmits the control command corresponding to the control equipment to the equipment of operation target, so as to execute the control item.

With the operation controlling apparatus explained in the above, even when the notice from the control-enabled equipment, it is also possible to operate that, in the similar manner. However, as the notice from the control target equipment may be anything, such as, a notice of start of a program recommended from the TV, or a suggestion for power saving operation from the air conditioner, to etc. Also, as the screen image to be projected may be displayed a message from the control target equipment.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An operation controlling apparatus, for executing operation controlling for equipment, comprising:
   an equipment management portion, which is configured to manage control commands corresponding to a plural number of control items;
   a video producing portion, which is configured to produce videos corresponding to the plural number of control items;
   a video display portion, which is configured to display the video produced by the video producing portion laying on a control surface;
   a distance detector portion, which is configured to detect distance from the video producing portion to the control surface; and
   a controller portion, which is configured to control the video display portion, so that a size of the video to be displayed by the video display portion is within a size of the control surface, depending on the distance detected by the distance detector portion, and to make an equipment of a control target execute a control command associated with a control item, which is managed by the equipment management portion, when execution of the control item is determined, wherein the controller portion controls the video producing portion, so that the control item is changed depending on the distance detected by the distance detector portion.

2. The operation controlling apparatus, as described in the claim 1, wherein execution of the control item is determined when the distance detected by the distance detector portion changes repetitively.

3. The operation controlling apparatus, as described in the claim 1, further comprising a motion detector portion, which is configured to detect a movement of the operation surface, wherein the controller portion exchanges the equipment to be the control target, when the motion detector portion detects a predetermined movement.

4. The operation controlling apparatus, as described in the claim 2, wherein the execution of the control item is determined when a motion detector portion detects a predetermined movement.

5. An operation controlling apparatus, for executing operation controlling for equipment, comprising:
   an equipment management portion, which is configured to manage control commands corresponding to a plural number of control items;

a video producing portion, which is configured to produce videos corresponding to the plural number of control items;

a video display portion, which is configured to display the video produced by the video producing portion laying on a control surface;

a distance detector portion, which is configured to detect distance from the video producing portion to the control surface; and a controller portion, which is configured to:

control the video display portion, so that a size of the video to be displayed by the video display portion is within a size of the control surface, depending on the distance detected by the distance detector portion;

make an equipment of a control target execute the control command, which is managed by the equipment management portion, when execution of the control item is determined; and control the video producing portion, so that the control item is changed depending on the distance detected by the distance detector portion.

6. The operation controlling apparatus, as described in the claim 5, wherein execution of the control item is determined when the distance detected by the distance detector portion changes repetitively.

7. The operation controlling apparatus, as described in the claim 5, further comprising a motion detector portion, which is configured to detect a movement of the operation surface, wherein the controller portion exchanges the equipment to be the control target, when the motion detector portion detects a predetermined movement.

8. The operation controlling apparatus, as described in the claim 6, wherein the execution of the control item is determined when a motion detector portion detects a predetermined movement.

* * * * *